(12) United States Patent
Park

(10) Patent No.: US 10,773,640 B2
(45) Date of Patent: Sep. 15, 2020

(54) METHOD AND APPARATUS FOR AUTOMATICALLY ADJUSTING LUMINANCE OF VEHICLE TAIL LIGHT

(71) Applicant: Gyeongjune Park, Sejong (KR)

(72) Inventor: Gyeongjune Park, Sejong (KR)

( * ) Notice: Subject to any disclaimer, the term of this patent is extended or adjusted under 35 U.S.C. 154(b) by 0 days.

(21) Appl. No.: 16/328,709

(22) PCT Filed: Aug. 15, 2017

(86) PCT No.: PCT/KR2017/008854
§ 371 (c)(1),
(2) Date: Feb. 26, 2019

(87) PCT Pub. No.: WO2018/043953
PCT Pub. Date: Mar. 8, 2018

(65) Prior Publication Data
US 2019/0193626 A1 Jun. 27, 2019

(30) Foreign Application Priority Data

Aug. 31, 2016 (KR) .................. 10-2016-0111861
Jan. 3, 2017 (KR) .................. 10-2017-0000987

(51) Int. Cl.
*B60Q 1/30* (2006.01)
*B60W 40/105* (2012.01)
(Continued)

(52) U.S. Cl.
CPC .............. *B60Q 1/30* (2013.01); *B60Q 1/00* (2013.01); *B60Q 9/008* (2013.01);
(Continued)

(58) Field of Classification Search
CPC ....... B60Q 1/30; B60Q 9/008; B60W 40/105; B60W 2550/308; B60W 2420/54; B60W 2420/60; B60W 2420/40
See application file for complete search history.

(56) References Cited

U.S. PATENT DOCUMENTS 5,760,708 A * 6/1998 Seith .................. G01S 13/931
340/903
6,311,121 B1 * 10/2001 Kuragaki ........... B60K 31/0008
180/167
(Continued)

FOREIGN PATENT DOCUMENTS

| JP | 2012221303 A | 11/2012 |
| KR | 10-1997-0074264 A | 12/1997 |
| KR | 10-1998-0020708 A | 6/1998 |
| KR | 10-2011-0036366 A | 7/2011 |
| KR | 10-1646460 B1 | 8/2016 |
| WO | WO-9928151 A1 * | 6/1999 ............. B60Q 1/085 |

*Primary Examiner* — Renan Luque
(74) *Attorney, Agent, or Firm* — Jake K. Lee

(57) ABSTRACT

The present invention provides a method and an apparatus for dynamically controlling the luminance of a tail light of a vehicle tail lamp in response to a change in the difference of speed between a vehicle and a vehicle therebehind, and for preventing a collision between the traveling vehicles. In addition, the apparatus comprises: a tail light operating unit, which slowly or rapidly becomes brighter up to a predetermined brightness as the speed difference between the vehicle and the vehicle behind gradually becomes larger, and slowly or rapidly becomes darker down to a predetermined brightness as the speed difference between the vehicle and the vehicle behind gradually becomes smaller; a speed sensing unit for measuring the speed of the vehicle; a rear speed sensing unit for measuring the speed of the vehicle therebehind; and a control unit for automatically adjusting the luminance of the tail light by controlling the tail light operating unit when the vehicle therebehind is traveling faster than the vehicle.

12 Claims, 9 Drawing Sheets

(51) Int. Cl.
*B60Q 1/00* (2006.01)
*B60Q 9/00* (2006.01)

(52) U.S. Cl.
CPC ....... *B60W 40/105* (2013.01); *B60W 2420/40* (2013.01); *B60W 2420/54* (2013.01); *B60W 2420/60* (2013.01); *B60W 2554/801* (2020.02)

(56) References Cited

U.S. PATENT DOCUMENTS

| | | | |
|---|---|---|---|
| 2009/0134987 A1* | 5/2009 | Oltmann | B60Q 1/302 340/435 |
| 2013/0093582 A1* | 4/2013 | Walsh | B60Q 1/525 340/436 |
| 2015/0224921 A1* | 8/2015 | Matha | B60Q 1/2603 315/79 |
| 2016/0009283 A1* | 1/2016 | Tokimasa | B60W 30/16 701/96 |
| 2016/0332562 A1* | 11/2016 | Kim | G09G 5/006 |
| 2017/0297475 A1* | 10/2017 | Seitz | B60Q 1/0076 |
| 2017/0330464 A1* | 11/2017 | Yoo | B60Q 1/30 |
| 2017/0332458 A1* | 11/2017 | Salter | B60Q 1/04 |
| 2017/0355300 A1* | 12/2017 | Kurata | B60Q 1/0023 |

\* cited by examiner

Type of separating brake lamp and tail light

Type of combing brake lamp and tail light

METHOD AND APPARATUS FOR AUTOMATICALLY ADJUSTING LUMINANCE OF VEHICLE TAIL LIGHT

CROSS-REFERENCE TO RELATED APPLICATIONS

This application is a national stage application of International Patent Application No. PCT/KR2017/008854 filed on Aug. 15, 2017, which claims priority to Korean Patent Application No. 10-2016-0111861 filed on Aug. 31, 2016 and Korean Patent Application No. 10-2017-0000987 filed on Jan. 3, 2017, the entire contents of which are incorporated by reference herein.

TECHNICAL FIELD

The present invention relates to a method and an apparatus for preventing collisions between traveling vehicles, and more specifically, to a method and an apparatus for preventing collisions between vehicles, which dynamically control luminance of tail lights of vehicle tail lamps in response to a speed difference between a vehicle and a following vehicle.

BACKGROUND

Various types of lamps lit for safe driving are installed in a vehicle, and there are turn signal lamps, brake lamps, backup lamps, tail lights, emergency lights and the like on the rear side of the vehicle. The turn signal lamps perform a function of informing other vehicles or pedestrians of left and right traveling directions of the vehicle, which are mainly yellow color and flicker at regular intervals of one or two times a second. The brake lamps are red color and inform following vehicles that the vehicle is stopping when the driver stops the vehicle by stepping on the brake pedal. The backup lamps give a caution to following vehicles or pedestrians when the vehicle moves backwards, and the tail lights inform following vehicles of the presence of the vehicle at night. The emergency lights are lamps for indicating an emergency situation or a warning, which flash in orange color. In addition, a design which integrates these lamps in one piece is referred as a rear combination lamp. Other than these, there are side lights independently installed in the bumper to inform the width of the vehicle, a license plate light for illuminating the license plate, and the like.

The rear combination lamp informs following vehicles of the presence of the vehicle as the tail light is lit at night and performs an important function for maintaining a distance between the vehicle and the following vehicle while the vehicle runs.

However, the rear combination lamp is disadvantage in that it does not have a function of giving a special caution or warning when the driver of the following vehicle approaches the vehicle within a safe distance at a speed higher than that of the vehicle without reducing the speed in response to braking of the vehicle, abrupt natural reduction in speed, stopping of the vehicle in an emergency case, or the like, and when the following vehicle approaches too close, it may cause a rear-end collision as the late braking of the following vehicle cannot prepare for an unexpected situation or the like.

SUMMARY

The present invention relates to a safety system of a vehicle, and an object of the present invention is to provide a method and an apparatus for securing a safe distance to prepare for an unexpected situation and preventing an accident in advance, in which when a distance between the vehicle and a following vehicle is within a preset section and the speed of the following vehicle is higher than the speed of the vehicle while the engine of the vehicle is ON, luminance of the tail lights on the rear side of the vehicle gradually or rapidly increases up to a predetermined brightness in response to a change in the difference of speed as the difference of speed increases, and luminance of the tail lights on the rear side of the vehicle gradually or rapidly decreases to a normal brightness in response to a change in the difference of speed as the speed of the following vehicle becomes equal to the speed of the vehicle, to give a caution or a warning while the vehicle runs so that the driver or passengers on the following vehicle may recognize a change in the distance corresponding to a state of speed reduction of the vehicle and the change in the difference of speed through a change in the luminance of the tail lights on the rear side of the vehicle.

To accomplish the above object, according to an embodiment of the present invention, there is provided a method of automatically adjusting luminance of a tail light on the rear side of a vehicle, the method including the steps of: selecting ON/OFF of a tail light luminance automatic adjustment operation of the vehicle through an ON/OFF switch; determining, if the tail light luminance automatic adjustment operation is selected as ON, whether the engine of the vehicle is ON; determining whether the distance between the vehicle and a following vehicle is within a preset section while the engine of the vehicle is ON; determining, if the distance between the vehicle and the following vehicle is within the preset section, whether the speed of the following vehicle is higher than the speed of the vehicle; starting, if the speed of the following vehicle is higher than the speed of the vehicle, the tail light luminance automatic adjustment operation of the vehicle.

According to another embodiment of the present invention, the method of automatically adjusting luminance of a tail light further includes the step of: automatically and gradually or rapidly adjusting a maximum brightness value of the tail light on the rear side of the vehicle, in response to a change in the speed of the vehicle, to be increased to a predetermined range as the speed of the vehicle increases and to be decreased to a predetermined range as the speed of the vehicle decreases.

Preferably, after the tail light luminance automatic adjustment operation begins, the operation state is maintained until the distance between the vehicle and the following vehicle exceeds a preset section or the speed of the vehicle becomes higher than the speed of the following vehicle.

In addition, to accomplish the above object, according to an embodiment of the present invention, there is provided an apparatus for automatically adjusting luminance of a tail light on the rear side of a vehicle, the apparatus including: a speed sensing unit for sensing a speed of the vehicle occupied by a driver or a passenger; a rear speed sensing unit for sensing a speed of a following vehicle that runs behind the vehicle; a distance sensing unit for sensing a distance to the following vehicle; and a tail light driving unit for starting and stopping a tail light luminance automatic adjustment operation, and automatically adjusting luminance of the tail light on the rear side of the vehicle; a control unit for controlling the speed sensing unit to measure a driving speed of the vehicle, controlling the distance sensing unit to determine whether a distance between the vehicle and the following vehicle is within a preset section, controlling, if the distance between the vehicle and the following vehicle is within a preset section, the rear speed sensing unit to determine whether the speed of the following vehicle is higher than the speed of the vehicle, and controlling, if the speed of the following vehicle is higher than the speed of the vehicle, the tail light driving unit to automatically adjust luminance of the tail light.

According to another embodiment of the present invention, the apparatus for automatically adjusting luminance of a tail light further includes a luminance range conversion unit for automatically and gradually or rapidly adjusting a maximum brightness value of the tail light, to be increased to a predetermined brightness as the speed of the vehicle increases and to be decreased to a predetermined brightness as the speed of the vehicle decreases, and through the luminance range conversion unit, the control unit controls to automatically and gradually or rapidly adjust the maximum brightness value of the tail light on the rear side of the vehicle, in response to a change in the speed of the vehicle, to be increased to a predetermined range as the speed of the vehicle increases and to be decreased to a predetermined range as the speed of the vehicle decreases.

Preferably, the control unit controls the tail light driving unit to maintain, after the tail light luminance automatic adjustment operation begins, the operation state until the distance between the vehicle and the following vehicle exceeds a preset section or the speed of the vehicle becomes higher than the speed of the following vehicle.

Preferably, the distance sensing unit uses any one of a vehicle to everything (V2X) technique and a sensor. When the distance sensing unit uses the V2X technique, a distance measured by a communication technique between vehicles or between a vehicle and a thing is used, and when the distance sensing unit uses the sensor, the sensor is any one of an ultrasonic sensor, an infrared sensor and a Doppler sensor.

Preferably, the rear speed sensing unit uses any one of a vehicle to everything (V2X) technique and a sensor. When the rear speed sensing unit uses the V2X technique, a speed measured by a communication technique between vehicles or between a vehicle and a thing is used, and when the rear speed sensing unit uses the sensor, any one of an ultrasonic sensor, an infrared sensor and a Doppler sensor is used.

Preferably, the tail light driving unit controls change of a duty ratio in a PWM control method.

Preferably, the apparatus for automatically adjusting luminance of a tail light further includes an ON/OFF selection switch for selectively blocking power supplied to the control unit to selectively block the operation of automatically adjusting luminance of the tail light on the rear side of the vehicle.

According to the present invention, it is advantageous in that when a distance between a vehicle and a following vehicle is within a preset section and the speed of the following vehicle is higher than the speed of the vehicle while the engine of the vehicle is ON, luminance of the tail lights on the rear side of the vehicle gradually or rapidly increases up to a predetermined brightness in response to a change in the difference of speed as the difference of speed between the vehicle and the following vehicle increases, and luminance of the tail lights on the rear side of the vehicle gradually or rapidly decreases to a normal brightness in response to a change in the difference of speed as the speed of the following vehicle becomes equal to the speed of the vehicle, and thus as the driver or passengers on the following vehicle recognize a change in the distance corresponding to a state of speed reduction of the vehicle and the change in the difference of speed through a change in the luminance of the tail lights on the rear side of the vehicle, a caution or a warning is given to the driver or passengers on the following vehicle when the following vehicle approaches the vehicle at a high speed so that a safe distance for preparing for an unexpected situation may be secured to prevent in advance a rear-end collision or a collision accident unforeseen.

In addition, a caution or a warning may be given as the luminance of the tail lights on the rear side of the vehicle changes even when the brake lamps are not lit due to abrupt natural reduction in the speed of the vehicle or when the vehicle stops as an emergency situation occurs, and there is an effect of double warning through the change in the luminance of the tail lights on the rear side of the vehicle even when the brake lamps are lit as the vehicle stops.

Moreover, according to another embodiment of the present invention, as the range of the maximum brightness value of the luminance of the tail lights on the rear side of the vehicle is automatically adjusted according to the speed of the vehicle, a stronger warning is given to the following vehicle when the vehicle runs at a high speed, and as a caution of advising to pay attention to the distance, rather than a warning, is given at a low speed, the present invention has effects different at a high speed and at a low speed.

| DESCRIPTION OF SYMBOLS | |
|---|---|
| 1: Speed sensing unit | 2: Rear speed sensing unit |
| 3: Distance sensing unit | 4: Control unit |
| 5: Tail light driving unit | 6: Tail light |
| 7: Luminance range conversion unit | |

DETAILED DESCRIPTION OF THE DISCLOSURE

The features and advantages of the present invention will become more apparent from the following detailed description based on the accompanying drawings. Prior to this, the terms or words used in this specification and claims should be interpreted as meanings and concepts meeting the technical ideas of the present invention based on the principles that can define adequately the concept of the terms so that the inventor may explain his or her invention in the best way.

Hereinafter, a method and an apparatus for automatically adjusting luminance of a tail light on the rear side of a vehicle according to a preferred embodiment of the present invention will be described with reference to the accompanying drawings.

Figure 1A:
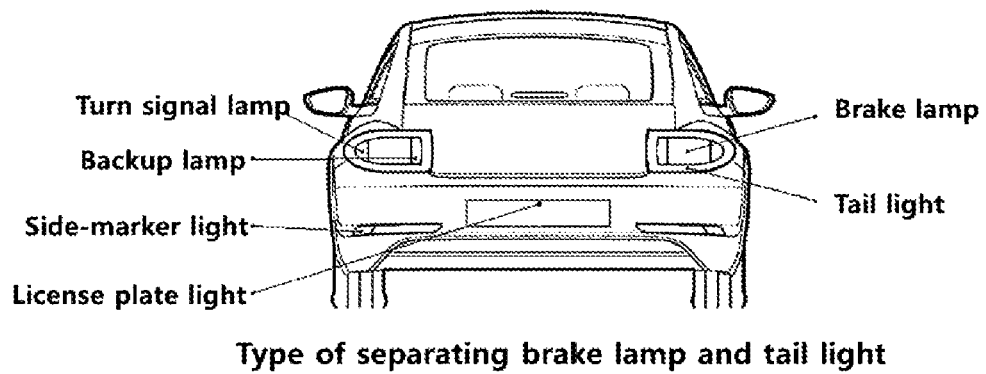
FIGS. 1a and 1b are views showing application parts of a rear combination lamp applied to a vehicle according to an embodiment of the present invention.
Figure 1B:
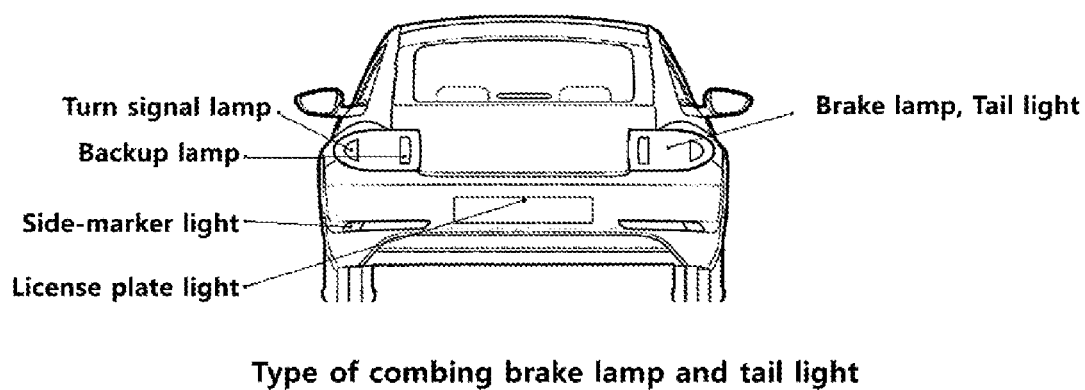

FIGS. 1a and 1b are views showing application parts of a rear combination lamp applied to a vehicle according to an embodiment of the present invention.

Figure 2A:
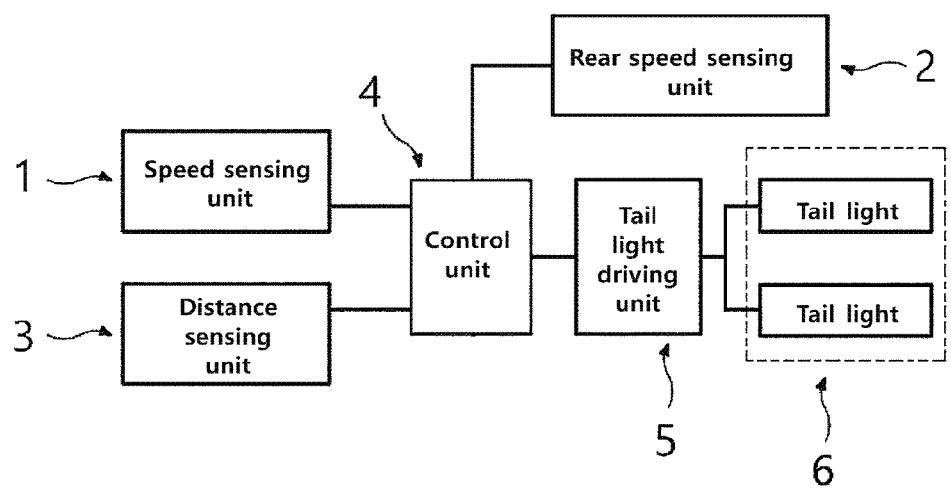
FIGS. 2a and 2b are block diagrams showing a method of automatically adjusting luminance of a tail light on the rear side of a vehicle according to the present invention.
Figure 3A:
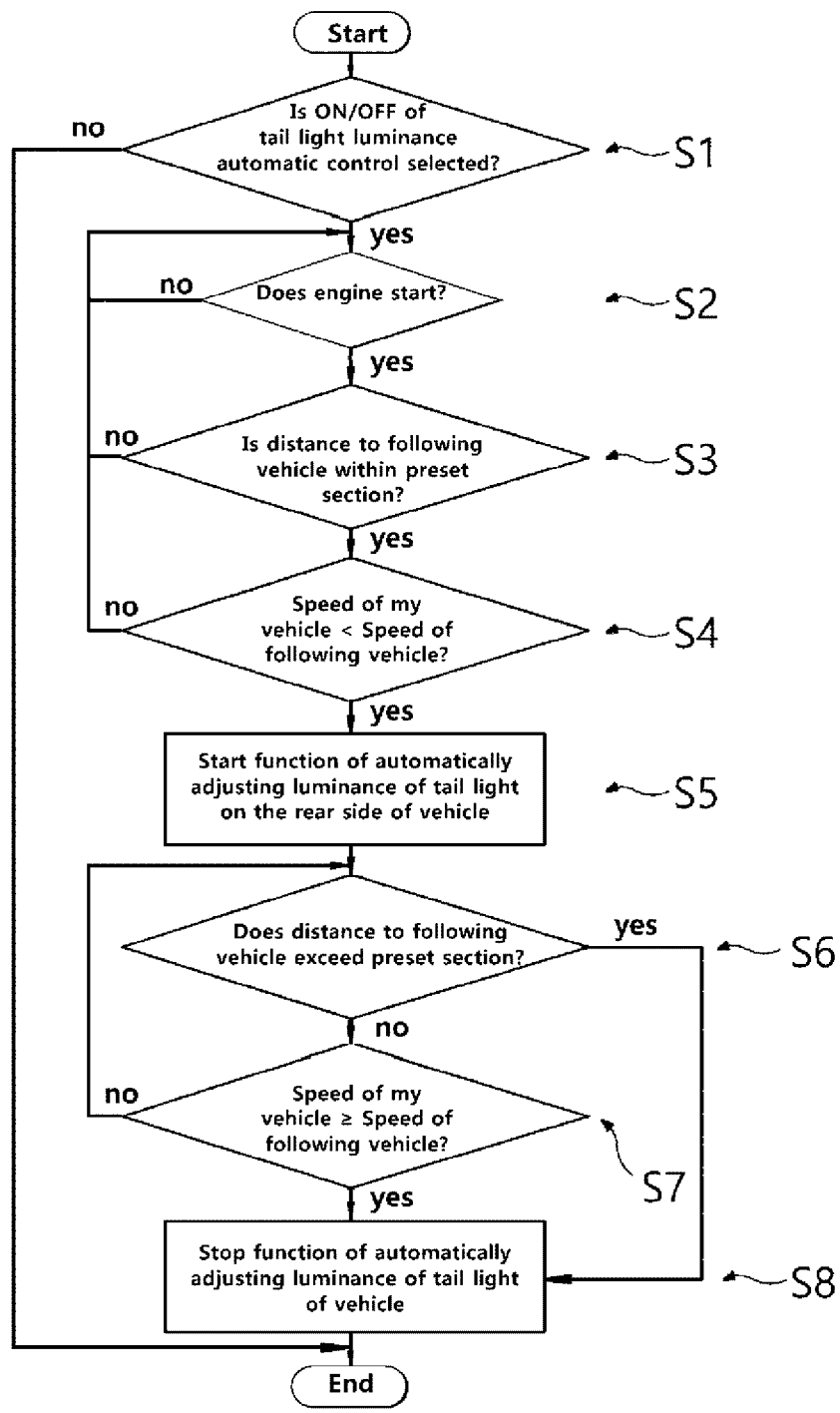
FIGS. 3a and 3b are flowcharts illustrating embodiments of a method of automatically adjusting luminance of a tail light on the rear side of a vehicle according to the present invention.
Figure 4A:
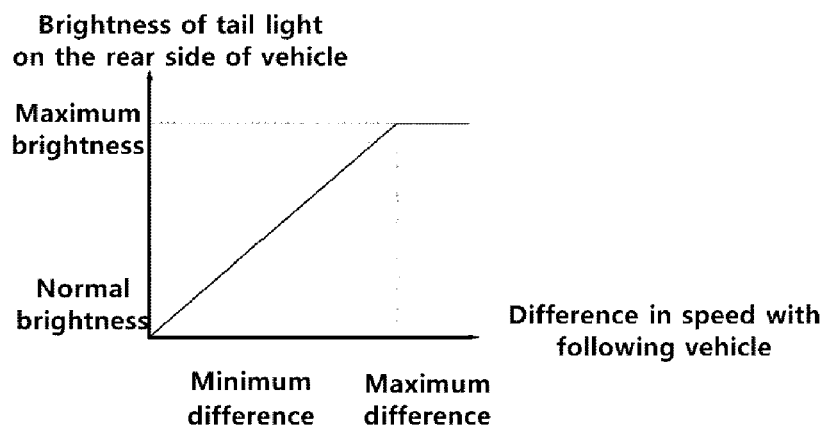
FIGS. 4a and 4b are a graph showing brightness of a tail light, changed by an apparatus for automatically adjusting luminance of a tail light on the rear side of a vehicle according to an embodiment of the present invention (FIG. 4a) and a graph showing movement of automatically adjusting a range of a maximum brightness value of a tail light, changed by the apparatus for automatically adjusting luminance of a tail light on the rear side of a vehicle according to an embodiment of the present invention (FIG. 4b).
Figure 5:
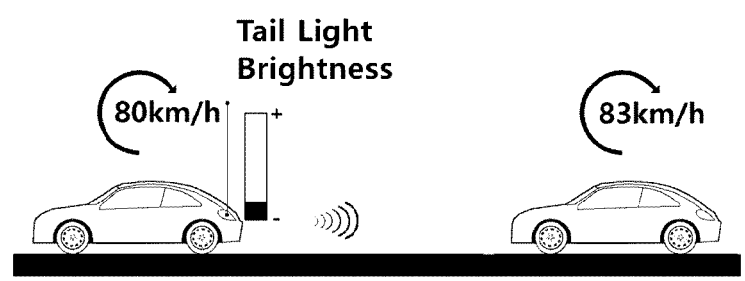
FIG. 5 is an exemplar view showing changes in the luminance of a tail light changed by an apparatus for automatically adjusting luminance of a tail light on the rear side of a vehicle according to an embodiment of the present invention.
Figure 5:
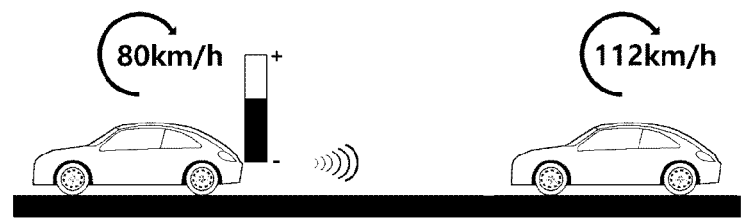

FIG. 2a is a block diagram showing a method of automatically adjusting luminance of a tail light on the rear side of a vehicle according to the present invention, FIG. 3a is a flowchart illustrating a method of automatically adjusting luminance of a tail light on the rear side of a vehicle according to the present invention, FIG. 4a is a graph showing changes in the luminance of a tail light on the rear side of a vehicle, changed by an apparatus for automatically adjusting luminance of a tail light according to an embodiment of the present invention, and FIG. 5 is an exemplar view showing changes in the luminance of a tail light on the rear side of a vehicle, changed by an apparatus for automatically adjusting luminance of a tail light according to an embodiment of the present invention.

Referring to FIGS. 1a and 1b, an apparatus for automatically adjusting luminance of a tail light on the rear side of a vehicle includes a configuration of a lamp in which a brake lamp and a tail light of a rear combination lamp of the vehicle are separated from each other (FIG. 1a) and a configuration of a lamp in which although the brake lamp and the tail light are combined in the same section, their function are distinguished by their maximum brightness or whether or not the lamps flash when the brake works (FIG. 1b).

Referring to FIG. 2a, the apparatus for automatically adjusting luminance of a tail light on the rear side of a vehicle includes: a speed sensing unit 1 for sensing a speed of the vehicle; a rear speed sensing unit 2 for sensing a speed of a following vehicle; a distance sensing unit 3 for sensing a distance to the following vehicle; and a control unit 4 for controlling the speed sensing unit, the rear speed sensing unit and the distance sensing unit, and automatically adjusting luminance of the tail light on the rear side of the vehicle by controlling a tail light driving unit of the vehicle when the distance between the vehicle and the following vehicle is within a preset section while the engine of the vehicle is ON (e.g., a preset section starting from two meters behind the vehicle with a distance of sixty meters to the following vehicle) and the speed of the following vehicle is higher than the speed of the vehicle (e.g., 50 Km/h of the vehicle<75 Km/h of the following vehicle); the tail light driving unit 5 for starting and stopping a tail light luminance automatic adjustment operation, and gradually or rapidly increasing or decreasing luminance of the tail light on the rear side of the vehicle in response to a change in the difference of speed between the vehicle and the following vehicle; and the tail light 6 for informing presence of the vehicle at night.

The distance sensing unit uses any one of a vehicle to everything (V2X) technique and a sensor. When the distance sensing unit uses the V2X technique, a distance measured by a communication technique between vehicles or between a vehicle and a thing is used, and when the distance sensing unit uses the sensor, an ultrasonic sensor, an infrared sensor or a Doppler sensor is used.

The rear speed sensing unit uses any one of a vehicle to everything (V2X) technique and a sensor. When the rear speed sensing unit uses the V2X technique, a speed measured by a communication technique between vehicles or between a vehicle and a thing is used, and when the rear speed sensing unit uses the sensor, an ultrasonic sensor, an infrared sensor or a Doppler sensor is used.

The tail light driving unit controls change of a duty ratio in a PWM control method.

Meanwhile, the apparatus for automatically adjusting luminance of a tail light on the rear side of a vehicle of the present invention may include a switch S1 for selecting ON/OFF of the tail light automatic adjustment operation.

A method of automatically adjusting luminance of a tail light on the rear side of a vehicle according to the present invention configured as described above will be described with reference to FIGS. 1 to 5.

The method of automatically adjusting luminance of a tail light on the rear side of a vehicle includes the steps of: selecting ON/OFF of a tail light luminance automatic adjustment operation through an option switch for selecting ON/OFF by handling of a user (step S1); determining, if the tail light luminance automatic adjustment operation is selected as ON, whether a distance between the vehicle and a following vehicle is within a preset section (e.g., a preset section starting from two meters behind the vehicle with a distance of sixty meters to the following vehicle) (steps S2 and S3); determining, if the distance between the vehicle and the following vehicle is within the preset section, whether the speed of the following vehicle is higher than the speed of the vehicle (e.g., 50 Km/h of the vehicle<75 Km/h of the following vehicle) (step S4); starting, if the speed of the following vehicle is higher than the speed of the vehicle, the tail light luminance automatic adjustment operation of the vehicle (step S5); and terminating the tail light luminance automatic adjustment operation of the vehicle, when the distance between the vehicle and the following vehicle exceeds the preset section or the speed of the vehicle becomes higher than the speed of the following vehicle after the tail light luminance automatic adjustment operation of the vehicle begins (steps S6, S7 and S8).

As a result, according to the present invention, it is advantageous in that when a distance between the vehicle and a following vehicle is within a preset section and the speed of the following vehicle is higher than the speed of the vehicle while the engine of the vehicle is ON, luminance of the tail light on the rear side of the vehicle gradually or rapidly increases up to a predetermined brightness in response to a change in the difference of speed as the difference of speed between the vehicle and the following vehicle increases, and luminance of the tail light on the rear side of the vehicle gradually or rapidly decreases to a normal brightness in response to a change in the difference of speed as the speed of the following vehicle becomes equal to the speed of the vehicle, and thus as the driver or passengers on the following vehicle recognize a change in the distance corresponding to a state of speed reduction of the vehicle and the change in the difference of speed through a change in the luminance of the tail light on the rear side of the vehicle, a caution or a warning is given to the driver or passengers on the following vehicle when the following vehicle approaches at a high speed while the engine of the vehicle is ON so that a safe distance for preparing for an unexpected situation may be secured to prevent in advance a rear-end collision or a collision accident unforeseen.

In addition, a caution or a warning may be given as the luminance of the tail light on the rear side of the vehicle changes even when the brake lamps of the vehicle are not lit, in the case of abrupt natural reduction in the speed of the vehicle, and there is an effect of double warning through the change in the luminance of the tail light on the rear side of the vehicle even when the brake lamps are lit as the vehicle stops.

MODE FOR CARRYING OUT THE INVENTION

The features and advantages of the present invention will become more apparent from the following detailed description based on the accompanying drawings. Prior to this, the terms or words used in this specification and claims should be interpreted as meanings and concepts meeting the technical ideas of the present invention based on the principles that can define adequately the concept of the terms so that the inventor may explain his or her invention in the best way.

Hereinafter, a method and an apparatus for automatically adjusting luminance of a tail light on the rear side of a vehicle according to another preferred embodiment of the present invention will be described with reference to the accompanying drawings.

FIGS. 1a and 1b are views showing application parts of a rear combination lamp applied to a vehicle according to an embodiment of the present invention.

Figure 2B:
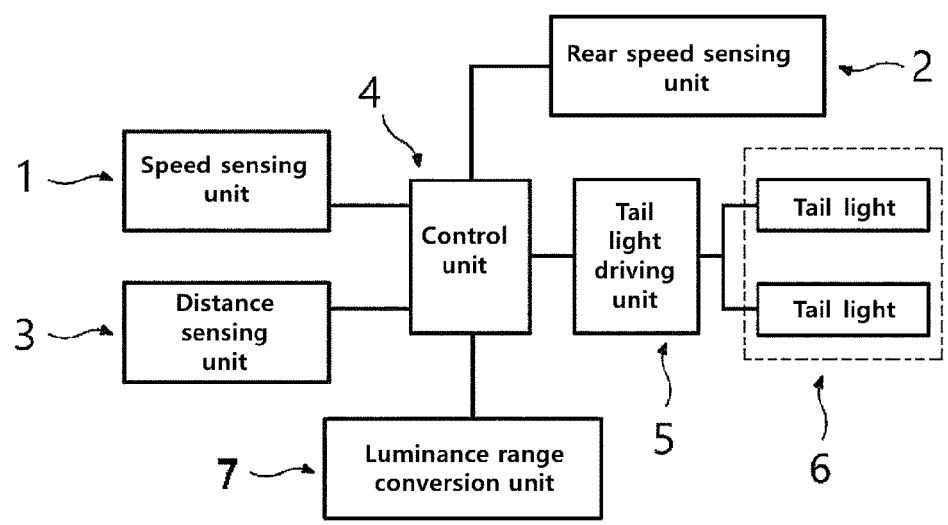
Figure 3B:
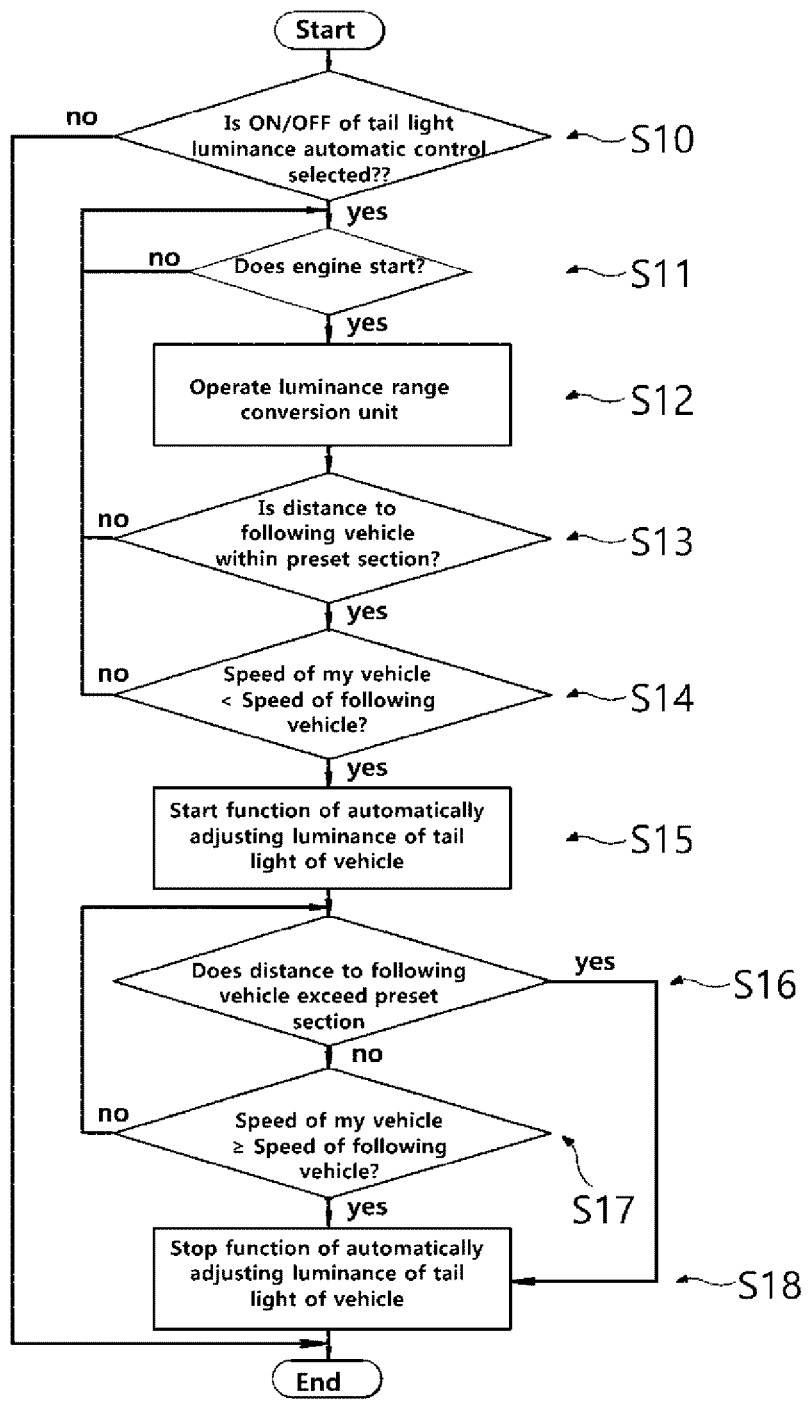
Figure 4B:
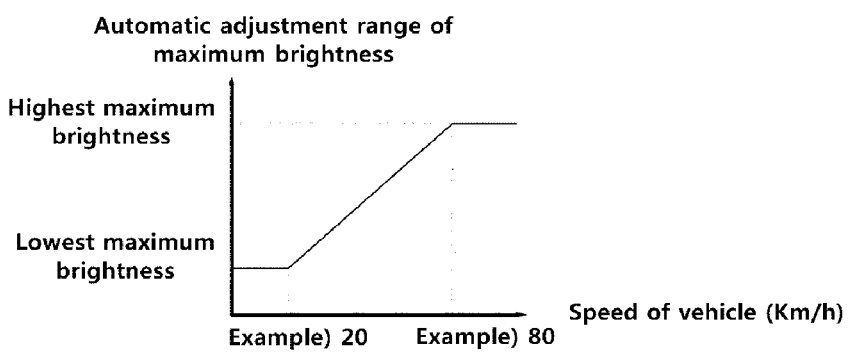

FIG. 2b is a block diagram showing a method of automatically adjusting luminance of a tail light on the rear side of a vehicle according to another embodiment of the present invention, FIG. 3b is a flowchart illustrating a method of automatically adjusting luminance of a tail light on the rear side of a vehicle according to another embodiment of the present invention, FIG. 4a is a graph showing changes in the luminance of a tail light on the rear side of a vehicle, changed by an apparatus for automatically adjusting luminance of a tail light according to an embodiment of the present invention, FIG. 4b is a graph showing movement of automatic adjustment of a maximum brightness value of a tail light, changed by the apparatus for automatically adjusting luminance of a tail light on the rear side of a vehicle according to another embodiment of the present invention, and FIG. 5 is an exemplar view showing changes in the luminance of a tail light on the rear side of a vehicle, changed by an apparatus for automatically adjusting luminance of a tail light according to an embodiment of the present invention.

Referring to FIGS. 1a and 1b, an apparatus for automatically adjusting luminance of a tail light on the rear side of a vehicle includes a lamp configuration in which a brake lamp and a tail light of a rear combination lamp of the vehicle are separated from each other (FIG. 1a), and a lamp configuration in which although the brake lamp and the tail light are combined in the same section, their function are distinguished by their maximum brightness or whether the lamps flash when the brake works (FIG. 1b).

Referring to FIG. 2b, the apparatus for automatically adjusting luminance of a tail light on the rear side of a vehicle includes: a speed sensing unit 1 for sensing a speed of the vehicle; a rear speed sensing unit 2 for sensing a speed of a following vehicle that runs behind the vehicle; a distance sensing unit 3 for sensing a distance to the following vehicle that runs behind the vehicle; a luminance range conversion unit 7 for automatically adjusting a maximum brightness value of the tail light on the rear side of the vehicle to be increased as the speed of the vehicle increases and to be decreased as the speed of the vehicle decreases; and a control unit 4 for controlling the speed sensing unit, the rear speed sensing unit, the distance sensing unit and luminance range conversion unit, automatically and gradually or rapidly adjusting the maximum brightness value of the tail light on the rear side of the vehicle, to be increased to a predetermined range as the speed of the vehicle increases and to be decreased to a predetermined range as the speed of the vehicle decreases while the engine of the vehicle is ON, and automatically adjusting the luminance of the tail light on the rear side of the vehicle by controlling a tail light driving unit of the vehicle when the distance between the vehicle and the following vehicle is within a preset section (e.g., a preset section starting from two meters behind the vehicle with a distance of sixty meters to the following vehicle) and the speed of the following vehicle is higher than the speed of the vehicle (e.g., 50 Km/h of the vehicle<75 Km/h of the following vehicle); the tail driving operating unit 5 for starting and stopping a tail light luminance automatic adjustment operation, and gradually or rapidly increasing or decreasing luminance of the tail light on the rear side of the vehicle in response to a change in the difference of speed between the vehicle and the following vehicle; and the tail light 6 for informing a vehicle that runs behind the vehicle of the presence of the vehicle at night.

The distance sensing unit uses any one of a vehicle to everything (V2X) technique and a sensor. When the distance sensing unit uses the V2X technique is used, a distance measured by a communication technique between vehicles or between a vehicle and a thing is used, and when the distance sensing unit uses the sensor, an ultrasonic sensor, an infrared sensor or a Doppler sensor is used.

The rear speed sensing unit uses any one of a vehicle to everything (V2X) technique and a sensor. When the rear speed sensing unit uses the V2X technique, a speed measured by a communication technique between vehicles or between a vehicle and a thing is used, and when the rear speed sensing unit uses the sensor, an ultrasonic sensor, an infrared sensor or a Doppler sensor is used.

The tail light driving unit controls change of a duty ratio in a PWM control method.

Meanwhile, the apparatus for automatically adjusting luminance of a tail light on the rear side of a vehicle of the present invention may include a switch for selecting ON/OFF of the tail light automatic adjustment operation.

A method of automatically adjusting luminance of a tail light on the rear side of a vehicle according to the present invention configured as described above will be described with reference to FIGS. 1 to 5.

The method of automatically adjusting luminance of a tail light on the rear side of a vehicle includes the steps of: selecting ON/OFF of a tail light luminance automatic adjustment operation through an option switch for selecting ON/OFF by handling of a user (step S10); automatically and gradually or rapidly adjusting, when the tail light luminance automatic adjustment operation is selected as ON, the maximum brightness value of the tail light on the rear side of the vehicle, to be increased to a predetermined range as the speed of the vehicle increases and to be decreased to a predetermined range as the speed of the vehicle decreases in response to a change in speed while the engine of the vehicle is ON (steps S11 and S12); determining, while the maximum brightness value of the tail light on the rear side of the vehicle is automatically and gradually or rapidly adjusted to be increased to a predetermined range as the speed of the vehicle increases and to be decreased to a predetermined range as the speed of the vehicle decreases, whether a distance between the vehicle and a following vehicle is within a preset section (e.g., a preset section starting from one meter behind the vehicle with a distance of eighty meters to the following vehicle) (step S13); determining, if the distance between the vehicle and the following vehicle is within the preset section, whether the speed of the following vehicle is higher than the speed of the vehicle (e.g., 50 Km/h of the vehicle<75 Km/h of the following vehicle) (step S14); gradually or rapidly increasing, when the speed of the following vehicle is higher than the speed of the vehicle, luminance of the tail light on the rear side of the vehicle up to a predetermined brightness in response to a change in the difference of speed as the difference of speed between the vehicle and the following vehicle increases, and gradually or rapidly decreasing the luminance of the tail light on the rear side of the vehicle to a normal brightness as the speed of the following vehicle that is faster than the vehicle becomes equal to the speed of the vehicle (step S15); and terminating the tail light luminance automatic adjustment operation of the vehicle, when the distance between the vehicle and the following vehicle exceeds the preset section or the speed of the vehicle becomes higher than the speed of the following vehicle after the tail light luminance automatic adjustment operation of the vehicle begins (steps S16, S17 and S18).

As a result, according to the present invention, it is advantageous in that since the range of the maximum brightness value of the tail light on the rear side of the vehicle is automatically and gradually or rapidly adjusted in response to a change in speed, to be increased to a predetermined brightness as the speed of the vehicle increases and to be decreased to a predetermined brightness as the speed of the vehicle decreases in response to the changing speed of the vehicle while the engine of the vehicle is ON, and when a distance between the vehicle and the following vehicle is within a preset section and the speed of the following vehicle is higher than the speed of the vehicle, luminance of the tail light on the rear side of the vehicle gradually or rapidly increases up to a predetermined brightness in response to a change in the difference of speed as the difference of speed between the vehicle and the following vehicle increases, and luminance of the tail light on the rear side of the vehicle gradually or rapidly decrease to a normal brightness in response to a change in the difference of speed as the speed of the following vehicle becomes equal to the speed of the vehicle, and thus as the driver or passengers on the following vehicle recognize a change in the distance corresponding to a state of speed reduction of the vehicle and the change in the difference of speed through a change in the luminance of the tail light on the rear side of the vehicle, a caution or a warning is given to the driver or passengers on the following vehicle when the following vehicle approaches at a high speed while the vehicle runs so that a safe distance for preparing for an unexpected situation may be secured to prevent in advance a rear-end collision or a collision accident unforeseen.

In addition, in the case of abrupt natural reduction in the speed of the vehicle, a caution or a warning may be given as the luminance of the tail light on the rear side of the vehicle changes even when the brake lamps of the vehicle are not lit, and there is an effect of double warning through the change in the luminance of the tail light on the rear side of the vehicle even when the brake lamps are lit as the vehicle stops.

Meanwhile, those skilled in the art may easily understand that the present invention is not limited only to the typical preferred embodiments described above and can be implemented by making various improvements, modifications, substitutions or additions within the scope of the present invention.

What is claimed is:

1. A method of warning a following vehicle using luminance of a tail light on a rear side of a vehicle and a difference of a speed between the vehicle and the following vehicle, the method comprising the steps of:
automatically adjusting a maximum brightness value of the tail light on the rear side of the vehicle, wherein the maximum brightness value is slowly or rapidly increased in response to an increase of the speed of the vehicle and the maximum brightness value is slowly or rapidly decreased in response to a decrease of the speed of the vehicle so as to change the maximum brightness value of the tail light in accordance with the speed of the vehicle,
determining whether the speed of the following vehicle is higher than the speed of the vehicle while automatically adjusting the range of the maximum brightness value of the tail light of the vehicle; and
adjusting luminance of the tail light on the rear side of the vehicle when the speed of the following vehicle is higher than the speed of the vehicle,
wherein the adjusting of the luminance of the tail light comprises the steps of:
determining a change of the difference of the speed between the vehicle and the following vehicle for a predetermined period of time so as to determine whether the difference of the speed between the vehicle and the following vehicle increases or decreases;
increasing the luminance of the tail light when the difference of the speed between the vehicle and the following vehicle increases, wherein the speed of increasing the luminance is controlled in response to an increasing rate of the difference of the speed between the vehicle and the following vehicle, wherein the luminance of the tail light is rapidly increased when the difference of the speed between the vehicle and the following vehicle is rapidly increased and the luminance of the tail light is slowly increased when the difference of the speed between the vehicle and the following vehicle is slowly increased; and
decreasing the luminance of the tail light when the difference of the speed between the vehicle and the following vehicle decreases, wherein the speed of decreasing the luminance is controlled in response to a decreasing rate of the difference of the speed between the vehicle and the following vehicle, wherein the luminance of the tail light is rapidly decreased when the difference of the speed between the vehicle and the following vehicle is rapidly decreased and the luminance of the tail light is slowly decreased when the difference of the speed between the vehicle and the following vehicle is slowly decreased.

2. The method according to claim 1, further comprising the step of selecting ON/OFF of a tail light luminance automatic adjustment operation of the vehicle through an option switch.

3. The method according to claim 1, further comprising the step of determining, before determining whether the difference of the speed between the vehicle and the following vehicle, whether an engine of the vehicle is ON.

4. The method according to claim 1, further comprising the step of determining, before determining whether the difference of the speed between the vehicle and the following vehicle, whether a distance between the vehicle and the following vehicle is within a preset section.

5. The method according to claim 1, wherein after the tail light luminance automatic adjustment operation begins, the operation state is maintained until the distance between the vehicle and the following vehicle exceeds a preset section or the speed of the vehicle becomes higher than the speed of the following vehicle.

6. An apparatus for warning a following vehicle using luminance of a tail light on a rear side of a vehicle and a difference of a speed between the vehicle and the following vehicle, the apparatus comprising:
a speed sensing unit sensing a speed of the vehicle;
a rear speed sensing unit sensing a speed of the following vehicle;
a luminance range conversion unit automatically adjusting a maximum brightness value of the tail light on the rear side of the vehicle, wherein the maximum brightness value is slowly or rapidly increased in response to an increase of the speed of the vehicle and the maximum brightness value is slowly or rapidly decreased in response to a decrease of the speed of the vehicle so as to change the maximum brightness value of the tail light in accordance with the speed of the vehicle;
a tail light driving unit selecting ON/OFF of a tail light luminance automatic adjustment operation of the vehicle and adjusting the luminance of the tail light in response to the increase or decrease of a speed difference between the vehicle and the following vehicle; and
a control unit controlling the speed sensing unit, the rear speed sensing unit, the luminance range conversion unit, and the tail light driving unit, and creating a control signal to control the tail light driving unit when a speed of the following vehicle is higher than a speed of the vehicle,
wherein the luminance of the tail light is increased when the difference of the speed between the vehicle and the following vehicle increases, wherein the speed of increasing the luminance is controlled in response to an increasing rate of the difference of the speed between the vehicle and the following vehicle, wherein the luminance of the tail light is rapidly increased when the difference of the speed between the vehicle and the following vehicle is rapidly increased and the luminance of the tail light is slowly increased when the difference of the speed between the vehicle and the following vehicle is slowly increased,
wherein the luminance of the tail light is decreased when the difference of the speed between the vehicle and the following vehicle decreases, wherein the speed of decreasing the luminance is controlled in response to a decreasing rate of the difference of the speed between the vehicle and the following vehicle, wherein the luminance of the tail light is rapidly decreased when the difference of the speed between the vehicle and the following vehicle is rapidly decreased and the luminance of the tail light is slowly decreased when the difference of the speed between the vehicle and the following vehicle is slowly decreased.

7. The apparatus according to claim 6, further comprising a distance sensing unit sensing a distance to the following vehicle, wherein the control unit is configured to measure a distance between the vehicle and the following vehicle through the distance sensing unit, determine whether the distance between the vehicle and the following vehicle is within a preset section, and determine the difference of the speed between the vehicle and the following vehicle through the speed sensing unit and the is rear speed sensing unit when the distance between the vehicle and the following vehicle is within the preset section.

8. The apparatus according to claim 6, wherein the control unit controls the tail light driving unit to maintain, after the tail light luminance automatic adjustment operation begins, the distance operation state until the distance between the vehicle and the following vehicle exceeds a preset section or and determine the vehicle becomes higher than the speed of the following vehicle.

9. The apparatus according to claim 6, wherein the rear speed sensing unit uses any one of a vehicle to everything (V2X) technique and a sensor, wherein
when the rear speed sensing unit uses the V2X technique, a speed measured by a communication technique between vehicles or between a vehicle and a thing is used, and when the rear speed sensing unit uses the sensor, any one of an ultrasonic sensor, an infrared sensor and a Doppler sensor is used.

10. The apparatus according to claim 7, wherein the distance sensing unit uses any one of a vehicle to everything (V2X) technique and a sensor, wherein
when the distance sensing unit uses the V2X technique, a distance measured by a communication technique between vehicles or between a vehicle and a thing is used, and when the distance sensing unit uses the sensor, the sensor is any one of an ultrasonic sensor, an infrared sensor and a Doppler sensor.

11. The apparatus according to claim 6, wherein the tail light driving unit controls change of a duty ratio in a PWM control method.

12. The apparatus according to claim 6, further comprising an option switch for selectively blocking power supplied to the tail light driving unit to selectively block an operation of the apparatus for automatically adjusting luminance of the tail light on a rear side of a vehicle.

* * * * *